Dec. 25, 1956    N. B. WILLIAMSON    2,775,464
FOLDABLE CART FOR MAILBAGS
Filed May 10, 1954    2 Sheets-Sheet 1
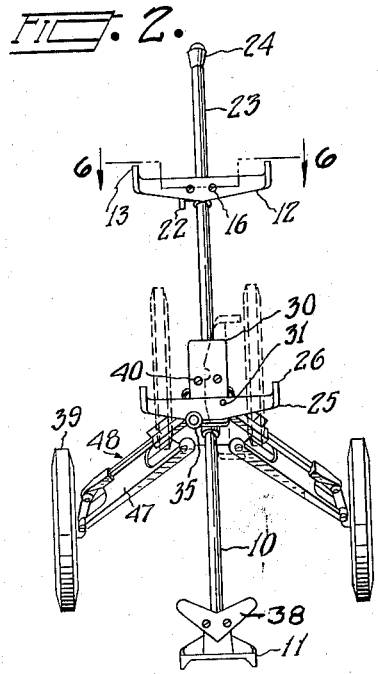
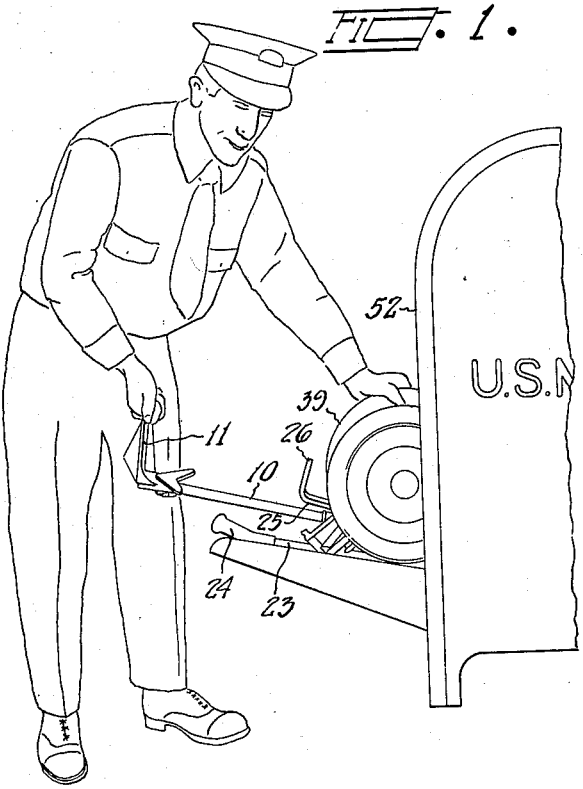
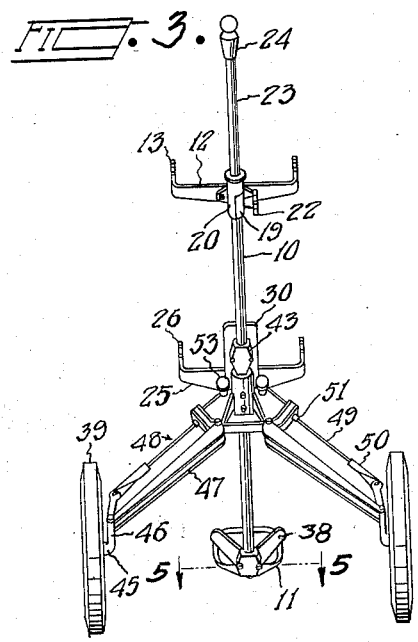
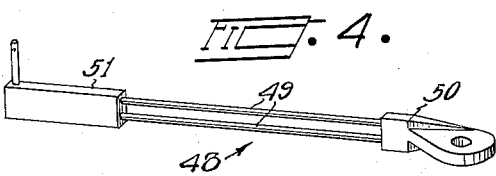
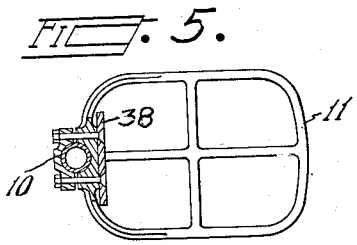
INVENTOR
NORMAN B. WILLIAMSON
BY
ATTORNEY Dec. 25, 1956  N. B. WILLIAMSON  2,775,464
FOLDABLE CART FOR MAILBAGS Filed May 10, 1954  2 Sheets-Sheet 2

INVENTOR
NORMAN B. WILLIAMSON
BY E. B. Birkenbeul
ATTORNEY

United States Patent Office 2,775,464
Patented Dec. 25, 1956

2,775,464

FOLDABLE CART FOR MAILBAGS

Norman Bruce Williamson, Portland, Oreg., assignor to Jarman-Williamson Company, a partnership Application May 10, 1954, Serial No. 428,670

5 Claims. (Cl. 280—38)

This invention relates generally to vehicles of the hand-propelled cart type and particularly to a foldable cart for mail bags.

The main object of this invention is to assist the mail carrier in transporting heavy quantities of mail to and from the storage boxes.

The second object is to provide a free-running, collapsible cart which can be folded so compactly that it will fit into a regulation mail storage box.

The third object is to so construct the cart that several carrying bags may be suspended therefrom, thereby providing more capacity and better segregation of the mail as to class and destination.

I accomplish these and other objects in the manner set forth in the following specification as illustrated in the accompanying drawing, in which:

Fig. 1 is a perspective view of a folded carrier being placed in a mail storage box.

Fig. 2 is a front elevation showing the folded position of the wheels in dotted lines.

Fig. 3 is a rear elevation of Fig. 2.

Fig. 4 is a perspective view of a strut.

Fig. 5 is a section taken along the line 5—5 in Fig. 3.

Before entering into an explanation of this invention, attention is called to my co-pending application, Serial No. 351,440, filed April 27, 1953, over which the device described herein is an improvement.

Figure 6:
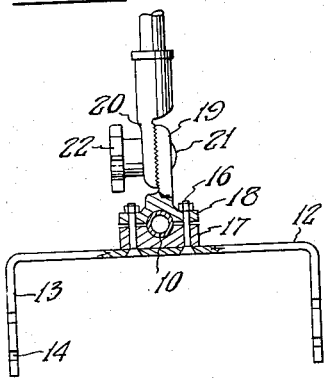
Fig. 6 is a section taken along the line 6—6 in Fig. 2.
Figure 8:
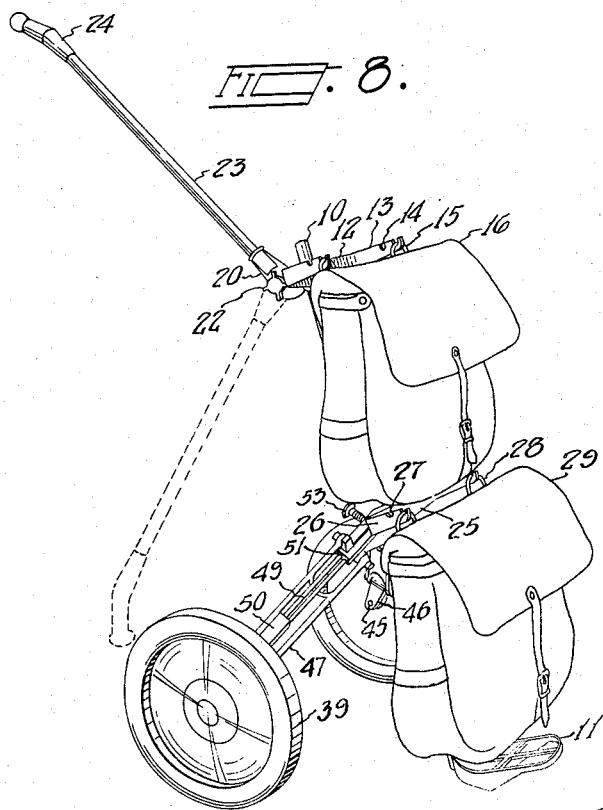
Fig. 8 is a perspective view of the device carrying two mail bags.

Referring in detail to my invention, the same is provided with a tubular upright frame 10 on the lower end of which is secured a somewhat rectangular base 11 which forms a ground-engaging foot for the frame 10 when in the position shown in Fig. 8.

At the upper end of the tubular frame 10 is disposed a U-shaped upper supporting arm 12 whose side arms 13 are provided with notches 14 on the top side thereof to receive the rings 15 of the mail bag 16. A number of notches 14 are provided to enable the carrier to better balance the load. The arm 12 is secured by means of screws 16 and clamping plates 17 and 18 to the frame 10 to which their relationship is fixed. The clamp 18 has extending therefrom a serrated arm 19 to which is joined a serrated socket 20, which is clamped thereto by a screw 21 and thumb nut 22. In the socket 20 is secured a handle bar 23 provided with a hand grip 24.

It will be seen in Fig. 8 that the handle bar 23 may be held in the position shown in full lines in Fig. 8 when the cart is being moved on its own wheels, or swung downwardly as shown in dotted lines in Fig. 8 when the cart is being stored or not in actual use.

Figure 7:
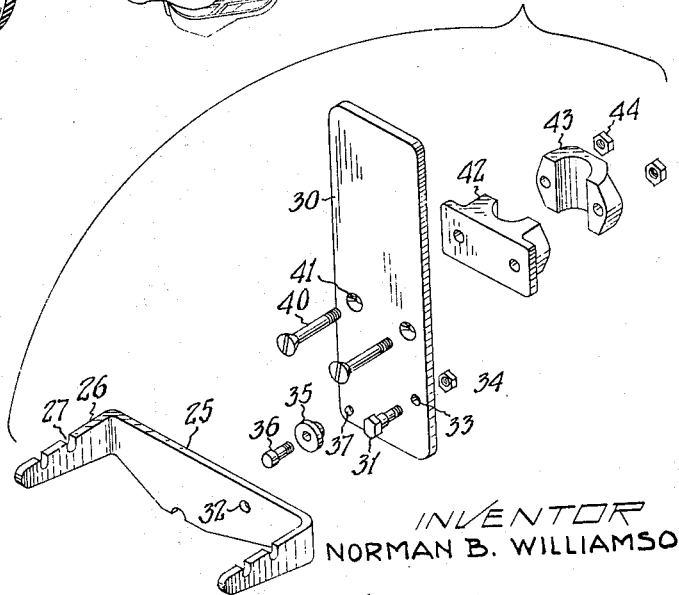
Fig. 7 is a perspective exploded view of the lower bracket and mounting parts.

In Fig. 7 is shown the lower supporting bracket 25 whose side arms 26 are provided with notches 27 which receive the rings 28 of the lower bag 29. The bracket 25 is pivotally mounted against the front of the face plate 30 by means of a bolt 31 which extends through a hole 32 in the bracket 25 and through the hole 33 in the plate 30 to which it is secured by a nut 34.

A stop 35 in the form of a shouldered washer is slidably mounted on the screw 36 which is threaded in the hole 37 formed in the plate 30, so that when the stop 35 is withdrawn the bracket 25 can swing on its bolt 31 and clear the supporting wheels 39, as shown in dotted lines in Fig. 2. It will be observed in Figures 2 and 7 that the hole 32 for pivotal mounting 31 is eccentrically located at a distance on one side of the center of the bracket 25 and that the stop 35 is eccentrically located at a distance on the opposite side of the center of the bracket whereby, when the bracket is loaded, it rests in stable position on the stop 35 with the stop supporting a part of the load. The plate 30 is attached to the frame 10 by screws 40 which pass through the holes 41 in the plate 30 and through the clamp portions 42 and 43, while on the end of said screws are placed the nuts 44.

The mounting of the wheels 39 is similar to those in the pending application, Serial No. 351,440.

Briefly, each wheel 39 is mounted on a spindle 45, whose arm 46 forms one end of a folding arm whose side 47 is double to provide strength, while its strut 48 includes two rods 49 which unite the ends 50 and 51.

This construction simply permits the wheels 39 to move from a spread parallel position shown in full lines in Fig. 2, to a collapsed parallel position as shown in dotted lines in Fig. 2. It will also be noted that while collapsing the wheels 39 they move toward the upper or handle end of the device to facilitate storing of same in a mail storage box 52, as shown in Fig. 1.

In Figs. 3 and 5, it will be noted that the frame 11 is provided with a V-shaped plate 38 which is placed above the base 11. The lower bag 29 will rest against this plate 38 and be prevented from oscillating about the tube 10. The upper end of the plate 30 above the screws 40 performs the same function for the upper bag 16.

The operation of the device is as follows: When using the cart for transporting bags of mail to or from a box 52, or along a delivery line, the carrier merely releases the wheels 39 by pressing the triggers 53, which permits the wheels to be moved to extended position. The bracket 25 is then moved to a horizontal position and the bags 16 and 29 are put into place as shown in Fig. 1. In some cases a basket may be used in the upper bracket or arm 12, if desired.

I claim:

1. A cart for mail bags and the like comprising a longitudinal frame having retractible wheels adapted to fold together on opposite sides of said frame, a cross bar load carrying bracket pivotally mounted on said frame for swinging movement to a folded position parallel with said frame between said wheels when the wheels are retracted, and a stop member mounted on said frame at a distance from the pivotal mounting of said bracket to engage and support said bracket in load carrying position transversely of said frame when the wheels are extended.

2. A cart for mail bags and the like comprising a longitudinal frame having retractible wheels adapted to fold together on opposite sides of said frame, a cross bar load carrying bracket pivotally mounted on said frame at one side of the center of said bracket for swinging movement to a folded position parallel with said frame member between said wheels when the wheels are retracted, and a stop member mounted on said frame at a distance from said pivotal mounting on the other side of the center of said bracket to engage and support said bracket in load carrying position transversely of said frame.

3. A cart for mail bags and the like comprising a single longitudinal frame member having retractible wheels adapted to fold together on opposite sides of said frame member, a plate on said frame member, a cross bar bracket for carrying a load, an eccentric pivotal mounting on said plate for said bracket disposed at one side of the center of said bracket to accommodate swinging movement of said bracket to a folded position parallel with said frame member between said wheels when the wheels are retracted, and a stop member on said plate at a distance from said pivotal mounting on the opposite side of the center of said bracket to engage and support said bracket in load carrying position transversely of said frame when the wheels are extended.

4. A cart for mail bags and the like comprising a single longitudinal frame member having retractible wheels adapted to fold together on opposite sides of said frame, a first cross bar load carrying bracket on said frame member above the folded position of the wheels, a plate on said frame member below said bracket for engaging and stabilizing a load on said bracket, a second cross bar bracket pivotally mounted on said plate for swinging movement to a folded position parallel with said frame member between said wheels when the wheels are retracted, means for holding said second bracket in a transverse load carrying position relative to said frame member, and means on said frame member below said second bracket arranged to engage and stabilize a load on said second bracket.

5. A cart for mail bags and the like comprising an upright longitudinal frame having retractible wheels adapted to fold together on opposite sides of said frame, upper and lower U-shaped cross bar brackets having notched load supporting arms, means fixedly mounting said upper bracket on the upper end of said frame, means pivotally mounting the lower bracket on a mid portion of said frame for swinging movement to a folded position parallel with said frame between said wheels when the wheels are retracted, and stop means on said frame for releasably holding said lower bracket in load carrying position transversely of said frame when the wheels are extended.

References Cited in the file of this patent

UNITED STATES PATENTS

| | | |
|---|---|---|
| 1,486,655 | Gourley | Mar. 11, 1924 |
| 2,523,893 | Williamson | Sept. 26, 1950 |

FOREIGN PATENTS

| | | |
|---|---|---|
| 867,856 | France | Dec. 2, 1941 |